(12) United States Patent
Wu

(10) Patent No.: US 6,297,940 B1
(45) Date of Patent: Oct. 2, 2001

(54) PROTECTION SYSTEM FOR DEVICES IN AN ELECTRICAL DISTRIBUTION NETWORK

(75) Inventor: Shawkang Wu, Muskego, WI (US)

(73) Assignee: McGraw Edison Company, Houston, TX (US)

( * ) Notice: Subject to any disclaimer, the term of this patent is extended or adjusted under 35 U.S.C. 154(b) by 0 days.

(21) Appl. No.: 09/426,180

(22) Filed: Oct. 25, 1999

Related U.S. Application Data
(60) Provisional application No. 60/158,023, filed on Oct. 7, 1999.

(51) Int. Cl.[7] ....................................................... H02H 3/18
(52) U.S. Cl. ................................. 361/79; 361/15; 323/211
(58) Field of Search .................................. 361/78–80, 15, 361/62, 65; 323/205–211; 702/65

(56) References Cited

U.S. PATENT DOCUMENTS

| | | |
|---|---|---|
| 3,703,680 | 11/1972 | Frank et al. . |
| 3,731,183 | 5/1973 | Johnson et al. . |
| 4,300,182 * | 11/1981 | Schweitzer, III ....................... 361/79 |
| 4,317,076 | 2/1982 | Price . |
| 4,377,833 | 3/1983 | Udren . |
| 4,529,926 | 7/1985 | Takada . |
| 4,555,658 | 11/1985 | Häusler et al. . |
| 4,713,604 * | 12/1987 | Becker et al. ......................... 324/500 |
| 4,855,890 | 8/1989 | Kammiller . |
| 4,999,565 | 3/1991 | Nilsson . |
| 5,422,561 * | 6/1995 | Williams et al. ...................... 323/209 |
| 5,440,442 | 8/1995 | Taylor . |
| 5,670,864 * | 9/1997 | Marx et al. ........................... 323/211 |

OTHER PUBLICATIONS

"IEEE Standard Requirements, Terminology, and Test Code for Shunt Reactors Rated Over 500 kVA", C57.21–1990; by the Inst. Of Electrical and Electronics Engineers, Inc. and approved Aug. 13, 1990 by IEEE Standards Board, pp. 1–15.

"IEEE Standard for Shunt Power capacitors", IEEE Std 18–1992; by the Inst. Of Electrical and Electronics Engineers, Inc. and approved Sep. 17, 1992 by IEEE Standards Board, pp. 1–5, 10.

"IEEE Guide for the Protection of Shunt Capacitor Banks", IEEE C37.99–1990; by the Inst. Of Electrical and Electronics Engineers, Inc. and approved Sep. 28, 1990 by IEEE Standards Board, p. 1.

"IEEE Guide for the Protection of Shunt Reactors", ANSI/IEEE C37.109–1998; by the Inst. Of Electrical and Electronics Engineers, Inc. and approved Oct. 20, 1988 by IEEE Standards Board, pp. 7 and 11.

"IEEE Guide for the Protection of Shunt Capacitor Banks", IEEE C37.99–1990; by the Inst. Of Electrical and Electronics Engineers, Inc. and approved Sep. 28, 1990 by IEEE Standards Board, pp. 1–59.

* cited by examiner

Primary Examiner—Michael J. Sherry
(74) Attorney, Agent, or Firm—Fish & Richardson, PC

(57) ABSTRACT

A computer-implemented protection system is used in a multi-phase electrical distribution network. The system includes a sensor operable to measure an impedance of a device connected to a phase of the distribution network. The device improves coupling of electrical potential from a source to a load. The system also includes a processor connected to the sensor and programmed to receive an impedance measurement from the sensor. The processor automatically calculates a variation in impedance of the device, the variation being based on a ratio of the impedance measurement and a previous impedance measurement. The processor automatically performs a protection analysis of the device based on the impedance variation.

45 Claims, 5 Drawing Sheets

| START UP VARIATIONS | STEADY STATE VARIATIONS |
|---|---|
| $R_{ABi} = \left| \dfrac{Z_{Ai}}{Z_{Bi}} - \dfrac{Z_{Ao}}{Z_{Bo}} \right|$ | $R_{Ai} = \left| \dfrac{Z_{Ai}}{Z_{Ai-1}} - 1 \right|$ |
| $R_{BCi} = \left| \dfrac{Z_{Bi}}{Z_{Ci}} - \dfrac{Z_{Bo}}{Z_{Co}} \right|$ | $R_{Bi} = \left| \dfrac{Z_{Bi}}{Z_{Bi-1}} - 1 \right|$ |
| $R_{CAi} = \left| \dfrac{Z_{Ci}}{Z_{Ai}} - \dfrac{Z_{Co}}{Z_{Ao}} \right|$ | $R_{Ci} = \left| \dfrac{Z_{Ci}}{Z_{Ci-1}} - 1 \right|$ |

PROTECTION SYSTEM FOR DEVICES IN AN ELECTRICAL DISTRIBUTION NETWORK

CROSS REFERENCE TO RELATED APPLICATION

The application claims priority from U.S. Provisional Application Ser. No. 60/158,023, having the same title and filed Oct. 7, 1999, which is incorporated by reference.

TECHNOLOGY FIELD

The invention relates to a protection system for devices in an electrical distribution network.

BACKGROUND

Devices such as capacitor banks and reactors are often installed into electrical distribution networks to maximize the delivery of power to a load.

SUMMARY

The invention provides a computer-implemented protection system for use in a multi-phase electrical distribution network. To this end, the system includes a sensor operable to measure an impedance of a device connected to a phase of the distribution network, the device used to improve coupling of electrical potential from a source to a load. The system also includes a processor connected to the sensor. The processor is programmed to receive an impedance measurement from the sensor, and to automatically calculate a variation in impedance of the device. The variation is based on a ratio of the impedance measurement and a previous impedance measurement. The processor is further programmed to automatically perform a protection analysis of the device based on the impedance variation.

Implementations may include one or more of the following features. For example, the device may include a capacitor or an inductor, or the sensor may include a relay.

The variation in impedance may be based on a difference between the ratio of the impedance measurements and one.

Performance of the protection analysis may include determining whether the impedance variation exceeds a predetermined threshold. Performance of the protection analysis may also include determining whether an excessive impedance variation has persisted for a predetermined period of time. The predetermined period of time may be based on the design of the distribution network, placement of the device in the distribution network, or a design of the device.

Performance of the protection analysis may include determining whether the impedance variation is caused by ambient temperature fluctuations.

The processor may be programmed to automatically perform a protective action for the device when it determines that the impedance variation exceeds a predetermined threshold for a predetermined period of time, which indicates that the excessive impedance variation is caused by a problem with the device. If the processor determines that the impedance variation is less than or equal to the predetermined threshold before expiration of the predetermined period of time, then the processor may assume that the impedance variation is caused by ambient temperature fluctuations and take no action for the device.

The system may also include a second sensor operable to measure a second impedance of a second device connected to a second phase of the distribution network, the second device being used to improve coupling of electrical potential from the source to the load. The processor may be connected to the second sensor, the processor being programmed to perform the following during a predetermined period of time after the device and the second device are turned on. The processor may receive a second impedance measurement from the second sensor, and may automatically calculate a start up variation in impedance of the device. The start up variation is based on a start tip comparison of the impedance measurement in the device to the second impedance measurement in the second device. The processor may automatically perform a start up protection analysis of the device based on the start up impedance variation. The start up comparison may be based on a difference between a start up ratio of the impedance measurement in the device to the second impedance measurement in the second device, and a ratio of an impedance measurement in the device taken before the device has been turned on to an impedance measurement in the second device taken before the second device has been turned on.

Performance of the start up protection analysis may include determining whether the start up impedance variation exceeds a predetermined threshold. Performance of the start up protection analysis may include determining whether an excessive start up impedance variation has persisted for a start up predetermined period of time. Performance of the start up protection analysis may include determining whether the start up impedance variation is caused by ambient temperature fluctuations.

The processor may be programmed to automatically perform a protective action for the device when it determines that the start up impedance variation exceeds a start up predetermined threshold for a start up predetermined period of time.

Other features and advantages will be apparent from the following description, including the drawings, and from the claims.

DETAILED DESCRIPTION

In an electrical distribution network, the apparent power $P_A$ is the product of the root-mean-squared (rms) voltage $V_{rms}$ and the rms current $I_{rms}$:

$$P_A = V_{rms} \cdot I_{rms}. \qquad 1$$

For purely sinusoidal voltage and current waveforms, the apparent power $P_A$ is the magnitude of a complex power S which, in the complex plane, has a real component P (average power) and an imaginary component Q (reactive power):

$$P_A = |S| = \sqrt{P^2 + Q^2}. \quad 2$$

Reactive power Q does not contribute to the net transmission of energy between the source and the load in the distribution network. Therefore, when reactive power is present, the rms current and the apparent power are greater than the minimum amount necessary to transmit the average power P. In particular, average power depends directly on the apparent power and the cosine of a phase angle difference $\phi$ between the current and the voltage:

$$P = P_A \cos\phi. \quad 3$$

Maximum power coupling is achieved when $\cos\phi$, called the power factor, equals one, which occurs when the phase angle difference $\phi$ is zero.

Devices may be installed into the distribution network to maximize the delivery of power to the load. In a device such as an inductor (or a reactor which includes a group of inductors), the current lags the voltage by 90°, causing the power factor for the inductor to be zero, such that the average power P is zero. Since the alternate storing and releasing of energy in the inductor leads to current flow and nonzero apparent power, an inductor can be viewed as an absorber of reactive power Q.

In contrast, in a device such as a capacitor (or a capacitor bank which includes a group of capacitors), the current leads the voltage by 90°, again causing the power factor and the average power to be zero. Capacitors, which generate reactive power Q, are commonly placed in the distribution network near inductive loads. If the reactive power generated by the capacitor in the network is equal to the reactive power absorbed by the inductor, then the net current (from the source into the capacitor-inductive-load combination) will be in phase with the voltage, leading to unity power factor and maximum power coupling between the source and the load.

Capacitors and inductors often are installed into each phase of an electrical distribution system to maximize the delivery of power to loads, and to provide maximum power coupling between the source and the load. For this reason, these devices are generally referred to as power-coupling devices.

Figure 1:
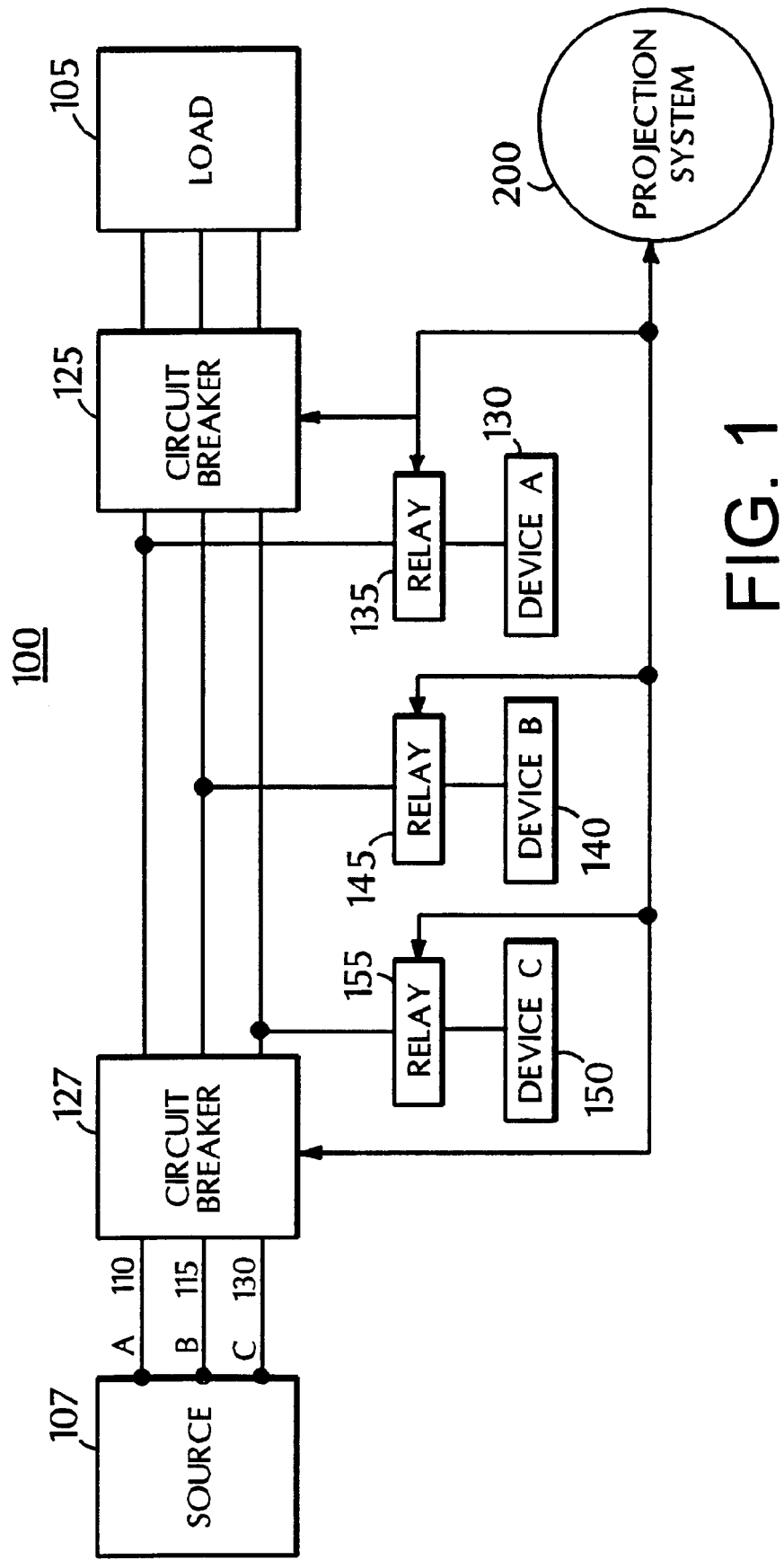
FIG. 1 is a block diagram of a segment of a generalized electrical distribution system.

Referring to FIG. 1, a generalized electrical distribution network 100 provides power to a load 105 from a three-phase source 107 of alternating electrical current operating at a typical frequency of 60 Hz. In the three phase system, the phases are labelled as phase A 110, phase B 115, and phase C 120. Power-coupling devices, such as capacitors and inductors, may be placed near the load 105 at a remote end of the network. Alternatively or additionally, the power-coupling devices may be placed at other points along the network 100, such as at the generator end of the network. Typically, a protective device, such as a relay, is associated with each power-coupling device.

The load 105 is protected at the local end of the network 100 with either three single-phase circuit breakers, or a single three-phase circuit breaker 125. Circuit breakers may be placed at other locations in the network, such as near the source 107, or at any other point between the source and the load. For example, circuit breaker 127 is shown in FIG. 1 upstream from the power-coupling devices.

A power-coupling device is inserted into each phase of the electrical distribution network 100. A device A 130 is connected to phase A through a protective relay 135 to provide power coupling adjustment to phase A. A device B 140 is connected to phase B through a protective relay 145 to provide power coupling adjustment to phase B. Finally, a device C 150 is connected to phase C through a protective relay 155 to provide power coupling adjustment to phase C.

Each power-coupling device 130, 140, 150 may be, for example, a reactor including a group of electrically connected inductors or a capacitor bank including a group of electrically connected capacitors. The distribution network 100 may employ both capacitor banks and reactors as devices on each phase or at different locations along the network for power coupling adjustment.

With the current and voltage sources treated as producing sinusoidal waveforms of angular frequency $\omega$, the capacitor and the inductor are represented mathematically in the complex plane. When the device has been fully energized, and is operating in the steady state, the capacitance C and inductance L are written in terms of the reactance X, which also may be referred to as the impedance Z for purely capacitive or purely inductive circuits:

$$\text{capacitive reactance} = X_C = -j/\omega C (j = \sqrt{-1}), \quad 4$$

$$\text{inductive reactance} = X_L = j\omega L. \quad 5$$

However, the impedance Z of a capacitor or inductor typically has a real component called the resistance R. The complex impedance Z is written in the complex plane as $R + j\omega L$ for an inductive circuit and $R + 1/\omega C$ for a capacitive circuit. Therefore, the ratio of the voltage across the capacitor to the current flowing through the capacitor is the magnitude of the capacitive impedance or $|Z_C|$. Similarly, the magnitude of the inductive impedance $|Z_L|$ is the ratio of the voltage across the inductor to the current flowing through the inductor. The measurements of the voltage across the device and the current through the device are performed at the relay associated with the device, with the relay being controlled and monitored by the protection system 200 described below.

The impedance may vary in response to component failures. For example, if one of the capacitors in a capacitor bank fails, then the capacitive impedance, which depends on the capacitance of the bank because of the reactance component in Eqn. 4, changes over a relatively short period of time. Likewise, if one of the turns in a reactor shorts, then the inductive impedance, which depends on the inductance of the inductor of the reactor because of the reactance component in Eqn. 5, changes over a relatively short period of time. Standards published by ANSI/IEEE recommend that the maximum deviation of impedance in any one phase for reactors shall be within 2% of the average impedance of the three phases. To respond to unacceptable deviations, and to avoid overvoltage to the load, a power-coupling device's associated relay is configured to open upon an excessive change in inductance.

The inductance also varies with ambient temperature. For example, in high voltage capacitors including aluminum plates and a dielectric fluid layer, changes in the ambient temperature cause the fluid layer to expand and contract, and thereby lower and raise the capacitance. For inductors, impedance changes due to shorted turns are comparable to the changes in impedance due to ambient temperature fluctuations, and are typically comparable to the limits of manufacturing tolerances of the inductors.

Typically, the change in impedance with temperature is small, for example, in the range of 0.03 to 0.05% per° C. For a device used in an area where ambient temperatures can vary from −40° C. in extremes of mid winter to +35° C. in the summer, this 75° C. swing can result in impedance changes from about 2 to 4%. This can be a concern for customers in such climates if the impedance shift due to capacitor bank imbalance or inductor shorting is less than that caused by temperature excursions. Moreover, the protective relay associated with the power coupling device preferably should not trip due to variations in impedance caused by such temperature variations. Thermometers that detect relatively small temperature fluctuations could be used to use temperature measurements to differentiate impedance variations due to capacitor failures, inductor shorts, or ambient temperature changes.

Figures 2, 4:
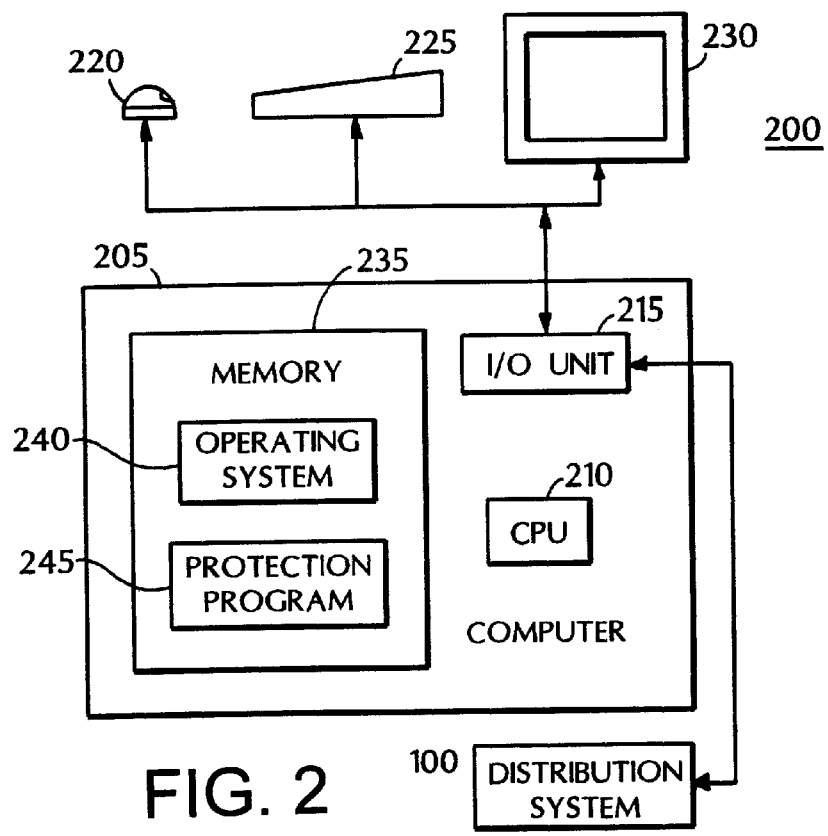
FIG. 2 is a block diagram of a protection system that distinguishes between impedance variations caused by device failure and impedance variations caused by temperature fluctuations.
FIG. 4 is a table of impedance variations calculated by the protection system.

Referring also to FIG. 2, a protection system 200 is used to distinguish impedance variations that are caused by capacitor failures and/or inductor shorts from those caused by temperature fluctuations. The protection system 200 may be implemented as a computer system that includes a general purpose computer 205 having a processor 210 and an input/output (I/O) unit 215 that connects to various devices external to the computer 205. I/O devices include a mouse 220, a keyboard 225, a display 230, and the electrical distribution system 100. A storage device or memory 235 stores data and programs such as an operating system 240 and a protection program 245.

Under control of the protection program 245, the processor 210 tracks the magnitude of the impedance which, for simplicity, is written as $Z_d$ in the following description (determined by the associated relay) of the power-coupling device for each phase of the distribution network 100. The index d identifies the type of power-coupling device, for example, d is "C" for a capacitor bank and d is "L" for an inductor.

The protection system 200 operates on two assumptions. The first assumption is that the ambient temperature does not change in an abrupt fashion. Except for the most extreme cases, temperature changes generally occur gradually. The ambient temperature would need to vary by more than 30° C. for the capacitance to change more than 1%. Because a 30° C. swing in a single day is fairly extreme, it may be assumed that it is even more unlikely for the temperature to swing 30° C. in shorter time frames. This implies that in steady state device conditions, if two calculated capacitance samples (or inductance samples) are close in time, there should be minimal difference in their capacitance (or inductance) due to temperature. Any significant difference is caused by a capacitor unit failure or a shorted turn in the inductor.

The second assumption is that the capacitor bank in each phase consists of a certain number of statistically identical individual capacitors whose inductance varies with temperature in an identical fashion. The corollary to this assumption is that the reactor in each phase consists of a certain number of statistically identical inductors whose impedance varies with temperature in an identical fashion.

When a capacitor bank or reactor is turned off (i.e., de-energized or disconnected), the ambient temperature may change significantly during the "off" time. Therefore, comparison of impedance measurements from before a device is turned off with measurements from and soon after the device is turned back on may not be meaningful. One way to avoid this problem is to ignore the first few measurements after a device is turned back on to obtain a base line. However, this would then miss any failures that may have occurred while the device was turned off or while it is re-energized after being turned back on. To address this, the processor implements a special start up state process which compares the ratio of the impedances of the phases with each other. This can accurately detect failures during the start up state, with the only limitation being that it cannot detect simultaneous failures in all three phases.

Figure 3:
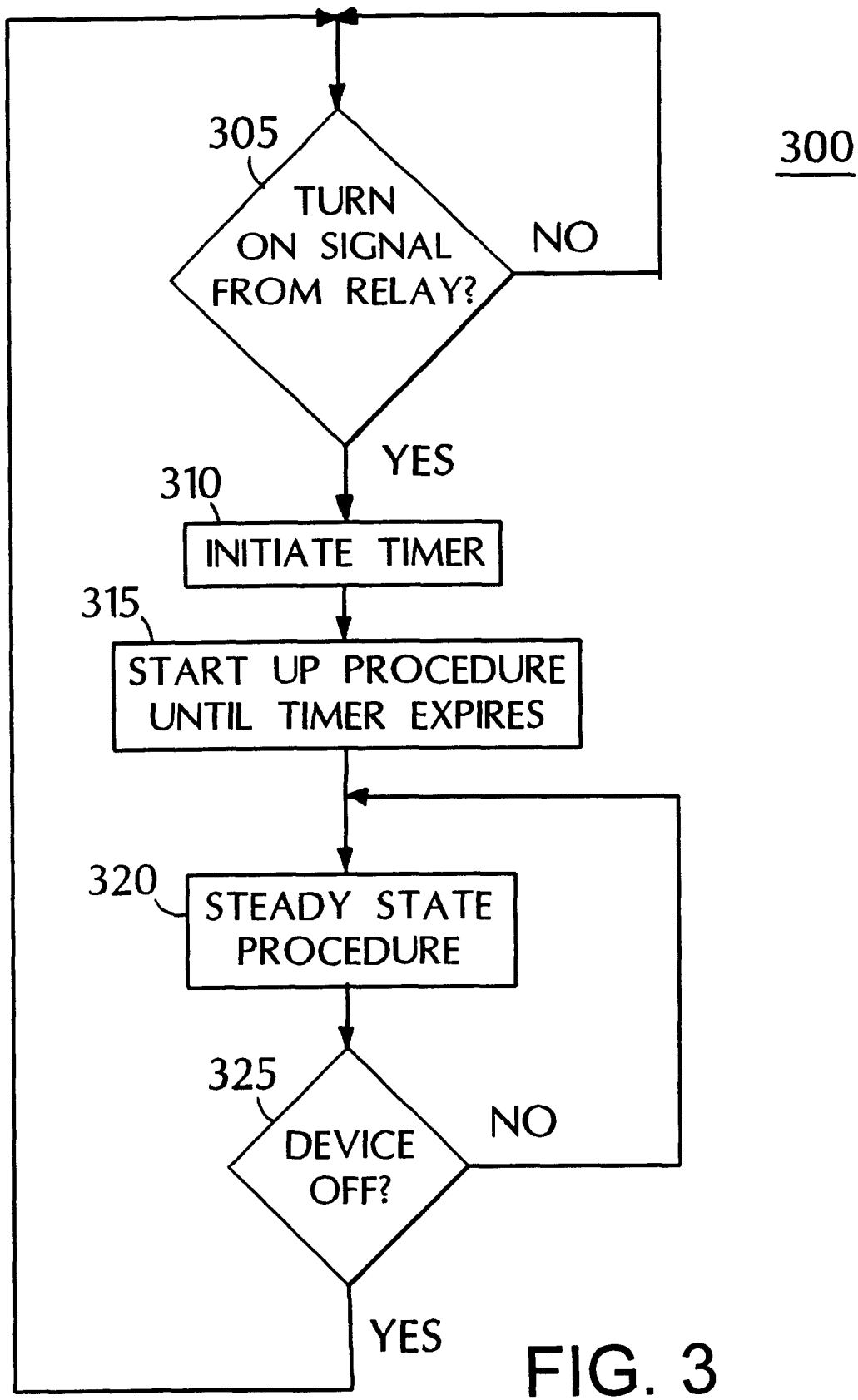
FIG. 3 is a flow chart of a procedure for selecting between two procedures for determining impedance variations.

Referring to FIG. 3, a flow chart of a procedure 300 is performed by the processor 210 to track variance in the power-coupling device's impedance using either one of two procedures. The procedures are associated with the two different states of the power-coupling device: the start up state and the steady state. In the start up state, the power-coupling device has been de-energized and recently been turned on, and operating characteristics of the network and/or device are fluctuating. In the steady state, the power-coupling device has been operating for a minimum period of time so that it has completely energized and its characteristics have stabilized.

The processor 210 determines whether the power-coupling device has been de-energized by checking one or more of several characteristics (step 305). For example, the processor 210 may check the voltage through the power-coupling device to determine whether operating frequency is substantially different from the 60 Hz standard frequency generated at the source. Likewise, the processor 210 may check the status of the relay associated with the device to determine when and how long the device has been de-energized.

When the processor determines that the power-coupling device has initially energized (step 305) (by, for example, detecting that an associated relay has closed) the processor 210 initiates a timer that expires at a predetermined period of time (step 310). After initiation of the timer (step 310), the processor executes the start up procedure until the timer expires (step 315). During the start up procedure (step 315), the processor calculates start up impedance variations, and compares these variations to a start up predetermined threshold. The start up predetermined threshold sets a cut off value for impedance variations between the phases.

Referring also to FIG. 4, a table 400 displays the start up variations 405, which are based on ratios of phase impedance. The symbol $Z_{Ai}$ represents the currently-determined impedance for phase A. Corresponding symbols for phase B and C are, respectively, $Z_{Bi}$ and $Z_{Ci}$. The symbols $Z_{A0}$, $Z_{B0}$, and $Z_{C0}$ are the impedances of the power-coupling devices on each phase when the device is not yet energized. Using these values, the processor compensates for manufacturing tolerances of the devices. The symbols $R_{ABi}$, $R_{BCi}$, and $R_{CAi}$ represent the start up variances, that is, the magnitude of the percent change of impedance between, respectively, phase A and B, phase B and C, and phase C and A.

The first variation 415, $R_{ABi}$, is the magnitude of the impedance percent change between phase A and phase B:

$$R_{ABi} = \left| \frac{Z_{Ai}}{Z_{Bi}} - \frac{Z_{A0}}{Z_{B0}} \right|. \qquad 6$$

The second variation 420, $R_{BCi}$, is the magnitude of the impedance percent change between phase B and phase C:

$$R_{BCi} = \left| \frac{Z_{Bi}}{Z_{Ci}} - \frac{Z_{B0}}{Z_{C0}} \right|. \qquad 7$$

The third variation 425, $R_{CAi}$, is the magnitude of the impedance percent chance between phase C and phase A:

$$R_{CAi} = \left| \frac{Z_{Ci}}{Z_{Ai}} - \frac{Z_{C0}}{Z_{A0}} \right|. \qquad 8$$

After the timer expires, the processor 210 operates the steady state procedure (step 320) until determining that the power-coupling device is turned off by, for example, detecting that the associated relay has opened (step 325).

The value of the predetermined period of time depends generally on the design of the distribution network 100, the placement of the power-coupling device, and the design of the power-coupling device. For example, stabilization of device characteristics may require more time for a relatively complex network, than for a simple distribution network.

Referring again to FIG. 4, during the steady state procedure, the processor calculates steady state variations 410 $R_{Ai}$, $R_{Bi}$, and $R_{Ci}$, and compares these variations to a steady state predetermined threshold. The symbol $Z_{Ai-1}$ represents the previously-determined impedance for phase A. Corresponding symbols for phase B and C are, respectively, $Z_{Bi-1}$ and $Z_{Ci-1}$. The steady state variations $R_{Ai}$, $R_{Bi}$, and $R_{Ci}$ represent the magnitude of the percent change in time of impedance for, respectively, phase A, phase B, and phase C.

For phase A, the steady state variation 430 is:

$$R_{Ai} = \left| \frac{Z_{Ai}}{Z_{Ai-1}} - 1 \right|. \qquad 9$$

The steady state variation for phase B 435 is:

$$R_{Bi} = \left| \frac{Z_{Bi}}{Z_{Bi-1}} - 1 \right|. \qquad 10$$

The steady state variation for phase C 440 is:

$$R_{Ci} = \left| \frac{Z_{Ci}}{Z_{Ci-1}} - 1 \right|. \qquad 11$$

Figure 5:
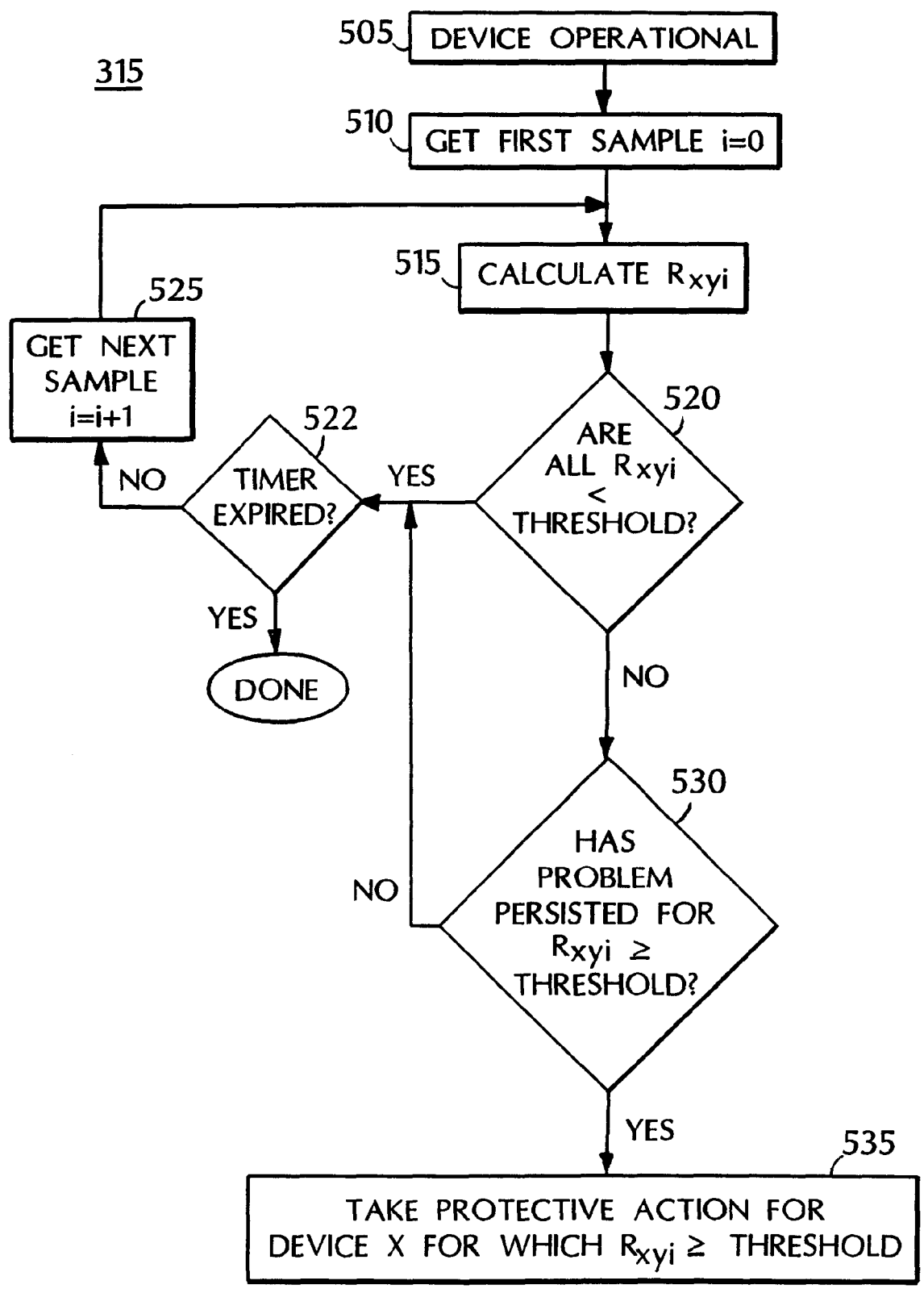
FIGS. 5 and 6 are flow charts of procedures performed by the protection system for tracking impedance and determining a cause of impedance variations.

Referring to FIG. 5, the processor 210 implements the start tip procedure 315 to track the impedance and determine whether start up impedance variations are due to temperature fluctuations or power-coupling device problems. When the processor 210 determines that the power-coupling device has been turned on recently (for example, re-energized or re-connected) (step 505), the processor 210 gets a first set of impedance samples $Z_d$ indexed by i before tracking (in time) the impedance $X_d$ of the device (step 510).

The processor calculates the set of start up impedance variations $R_{ABi}$, $R_{BCi}$, and $R_{CAi}$ for the current sample i (step 515). As described above, the processor estimates variations during start up based on ratios between the impedance of each phase at each current sample i. During steady state, impedance variations in a single phase between a previous sample and a current sample are calculated. However, these steady state variations would yield inconclusive results during the start up state because the distribution network and the device may not have stabilized yet and operating characteristics within a single phase may still be fluctuating. Ideally, during start up of the power-coupling devices, the impedances in each phase should be very nearly equal. However, capacitor failures and inductor shorts occur quite often when these devices are put into the network because of the drastic changes in impedance placed on the network. Therefore, during start up, the processor compares impedances of each phase to determine if a power-coupling device has failed.

The processor determines whether the calculated start up state variations are less than the start up predetermined threshold (step 520). The processor compares each of the variations $R_{ABi}$, $R_{BCi}$, and $R_{CAi}$ to the start up predetermined threshold, which may be, for example, a 1% variation threshold.

The processor determines if the start up state variation between phase A and B is less than 1%, if the start up state variation between phase B and C is less than 1%, and if the start up state variation between phase C and A is less than 1%. If all three variations are less than the start up predetermined threshold, then the processor determines that the impedance variation is due to ambient temperature fluctuations.

After determining that impedance variations are due to temperature (step 520), the processor determines whether a start up timer has expired (step 522). If so, the processor ends the start up procedure and proceeds to the steady state procedure. If not, the processor increments i (step 525) and obtains the next impedance samples (step 515).

If the processor determines that any one of the three variations is greater than or equal to the start up predetermined threshold (step 520), the processor determines if, for those variations exceeding the threshold, the large variation has persisted for a start up predetermined tracking time (step 530). This would indicate that the power-coupling device in that corresponding phase has failed. The processor monitors the duration of the start up state variations that are excessive to eliminate accidental network shut off due to noise. When the duration of an excessive variation has exceeded the start up tracking time, the processor takes protective action (step 535) for the corresponding device. For example, the processor may open the relay associated with the power-coupling device that exhibits excessive, persistent variations. Thereafter, a human controller may replace the faulty device with a fully operational one.

The start up tracking time may be set according to the design of the distribution network, the capacitor bank or reactor design, or any other parameters of the distribution network. For example, the start up tracking time might be 10 samples, a value small enough to protect the network, yet large enough to avoid mistakenly shutting off the power-coupling device.

If the start up variations have fallen below the predetermined threshold before expiration of the start up tracking time, then the processor infers that the relatively short-lived variations in that device are due to noise and that no action is needed. In this case, the processor increments i (step 525) and proceeds to obtain the next set of samples.

Figure 6:
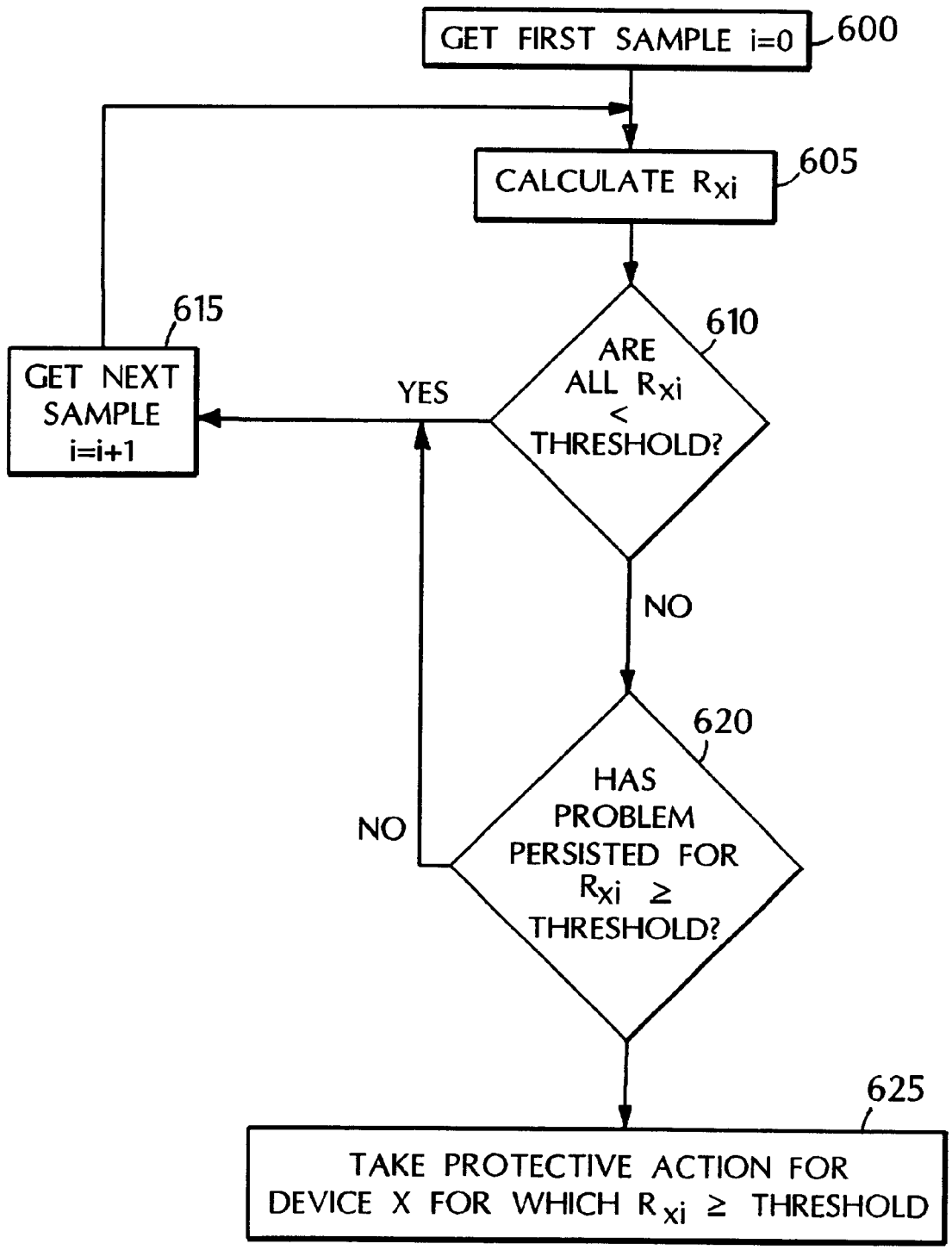

Referring to FIG. 6, the processor 210 implements the steady state procedure 320 similarly to the start up procedure 315. The processor gets a first set of impedance samples $Z_d$ indexed by i before tracking (in time) the impedance $Z_d$ of the device (step 600). The processor then calculates steady state impedance variations $R_{Ai}$, $R_{Bi}$, and $R_{Ci}$ for each phase of the network (step 605). As described above and shown in FIG. 4, the steady state impedance variations are based on a ratio between a previously-sampled impedance and a currently-sampled impedance. In this way, estimated impedance variations are independent of the size of the impedance. For example, an impedance of 3.00 that changes to 3.03 corresponds to a 1% change in impedance, as does an impedance of 1.00 that changes to 1.01. Ratios are used instead of differences to avoid any need to account for changing conductions, such as voltage changes, that do not affect the operating capabilities of the power-coupling device. If, for example, the impedance variation were determined by a difference in impedance, then the changes from 3.00 to 3.03 would appear to be three times as significant as the change from 1.00 to 1.01 which is not actually the case.

The processor next determines whether the calculated steady state variations are less than a steady state predetermined threshold (step 610). In particular, the processor compares each of the variations $R_{Ai}$, $R_{Bi}$, and $R_{Ci}$ to the steady state predetermined threshold, which may be, for example, a 1% variation threshold. The processor determines if the phase A steady state variation is less than 1%, if the phase B steady state variation is less than 1%, and if the phase C steady state variation is less than 1%. If all three phase variations are less than the steady state predetermined threshold, then the processor determines that the impedance variation is due to temperature fluctuations and increments i to get the next impedance sample (step 615).

If any one of the three phase variations is greater than or equal to the steady state predetermined threshold, then the processor determines whether the excessive variation has persisted for more than a steady state threshold time (step 620), which would indicate that the power-coupling device in the corresponding phase has failed. The processor does this to eliminate accidental device shut off due to noise in the network. If the variations in that particular device remain excessive for at least the steady state predetermined threshold time, then the processor takes protective action (step 625) for that device. For example, the processor may open the relay associated with the power-coupling device at which excessive variations have occurred. Alternatively, the processor could shut down the network using any of the circuit breakers (for example breaker 127) if the processor determines that variations are relatively large. Thereafter, a human controller would replace the faulty device with a fully operational device.

If the variations have not persisted for more than the steady state predetermined threshold time, the processor increments i (step 615) and obtains the next sample.

The processor need not track the device at each sample following detection of an excessive variation for that device. A detection of an excessive variation in $R_{Ai}$ would indicate that the sampled $Z_{Ai}$ probably exceeded a normal range of values compared to the previous sample $Z_{Ai-1}$. Therefore, the processor could wait a certain amount of time following detection of the excessive variation before determining if protective action is warranted. For example, the processor might wait 8 samples after detecting the excessive variation $R_{Ai}$ and measure the variation $R_A$ between the sample $Z_{Ai+8}$ and $Z_{Ai-1}$ to determine if the $Z_{Ai+8}$ sample, like the $Z_{Ai}$ sample, exceeds a normal range of values compared to the previous sample $Z_{Ai-1}$.

The waiting time may be preset to depend on the design of the distribution network, the capacitor bank or reactor design, or any other pertinent components in the distribution network. For example, a typical wait period might be 10 samples, a value small enough to protect the network, yet large enough to avoid mistakenly shutting off the power-coupling device.

Generally, after the processor is finished waiting, the processor calculates the steady state variation between the current sample and the saved previous sample. The processor determines whether the steady state variation for that device still exceeds the steady state predetermined threshold after the wait period. If the steady state variation drops below the steady state predetermined threshold during the waiting interval, then the processor infers that the variation was due to temperature fluctuations or some anomalous cause and takes no protective action on that device at that time. If the steady state variation remains above the steady state predetermined threshold after the waiting interval has expired, then the processor infers that the excessive variation is due to device failure on the corresponding phase. The processor therefore takes an action to isolate the faulty device from the distribution network (step 580). The faulty device may be isolated from the network by, for example, opening the relay associated with that device.

Other embodiments are within the scope of the claims. For example, selection of the predetermined thresholds may depend on several factors that each must be taken into consideration by the network designer. For example, the predetermined threshold (either steady state, start up, or both) may depend on how well the capacitor bank or reactor is insulated from ambient temperature changes. Likewise, the predetermined threshold may depend on how many capacitors are used in the capacitor bank, how many inductor there are in the reactor, or the design of the capacitors and inductors. Because impedance changes may have different effects on differently-designed distribution networks, the predetermined threshold may depend on the general design of the network. Furthermore, the predetermined threshold may be based on previous calculations that determine how changes in temperature affect changes in impedance. For example, if a previous analysis determined that a change in temperature of 40° C. caused a 1% change in impedance, then 1% might be a suitable value for the steady state predetermined threshold.

The processor may omit or bypass the tracking step and instead take protective action based on a single variation exceeding the threshold.

The protection system may be implemented in any multi-phase network with little adjustment to the procedure. Furthermore, the steady state procedure may be implemented in any single phase network.

The protection system may be used in any electrical distribution network in which power-coupling devices are used.

The predetermined thresholds may be set to depend on the phase or device. Likewise, the predetermined thresholds may be made adjustable by the network designer or engineer when the protection system is installed. Thus, the thresholds may be changed at any time depending on changes in the network, power-coupling devices used on the network, or different loads supplied by the network.

The impedance variations may be based on any previously sampled impedance, and not necessarily the most recent sampled impedance. For example, $R_{Ai}$ may be equal to:

$$\left| \frac{Z_{Ai}}{Z_{Ai-9}} - 1 \right|. \qquad 12$$

The processor may take protective action for any number of power-coupling devices that exhibit excessive variations. For example, the processor might determine that variations in every device are greater than the predetermined threshold. In that case, the processor determines if the excessive variations have persisted in each and every device with the excessive variations.

What is claimed is:

1. A computer-implemented protection system for use in a multi-phase electrical distribution network, the system comprising:

a sensor operable to measure an impedance of a device connected to a phase of the distribution network to improve coupling of electrical potential from a source to a load; and a processor connected to the sensor and programmed to:
receive an impedance measurement from the sensor,
automatically calculate a variation in impedance of the device, the variation being based on a ratio of the impedance measurement and a previous impedance measurement, and
automatically perform a protection analysis of the device based on the impedance variation.

2. The system of claim 1, wherein the device comprises a capacitor.

3. The system of claim 1, wherein the device comprises an inductor.

4. The system of claim 1, wherein the sensor comprises a relay.

5. The system of claim 1, wherein the variation in impedance is based on a difference between the ratio of the impedance measurements and 1.

6. The system of claim 1, wherein performance of the protection analysis comprises determining whether the impedance variation exceeds a predetermined threshold.

7. The system of claim 6, wherein performance of the protection analysis comprises determining whether an excessive impedance variation has persisted for a predetermined period of time.

8. The system of claim 7, wherein the predetermined period of time is based on the design of the distribution network.

9. The system of claim 7, wherein the predetermined period of time is based on the placement of the device in the distribution network.

10. The system of claim 7, wherein the predetermined period of time is based on a design of the device.

11. The system of claim 1, wherein performance of the protection analysis comprises determining whether the impedance variation is caused by ambient temperature fluctuations.

12. The system of claim 1, wherein the processor is programmed to automatically perform a protective action for the device when it determines that the impedance variation exceeds a predetermined threshold for a predetermined period of time.

13. The system of claim 12, wherein:
if the processor determines that the impedance variation exceeds the predetermined threshold for the predetermined period of time, then the processor assumes that the excessive impedance variation is caused by a problem with the device, and the processor performs the protective action for the device, and
if the processor determines that the impedance variation is less than or equal to the predetermined threshold before expiration of the predetermined period of time, then the processor assumes that the impedance variation is caused by ambient temperature fluctuations, and the processor takes no action for the device.

14. The system of claim 1, further comprising a second sensor operable to measure a second impedance of a second device connected to a second phase of the distribution network, the second device being used to improve coupling of electrical potential from the source to the load.

15. The system of claim 14, wherein the processor is connected to the second sensor, the processor being programmed to perform the following during a predetermined period of time after the device and the second device are turned on:

receive a second impedance measurement from the second sensor,
automatically calculate a start up variation in impedance of the device, the start up variation being based on a start up comparison of the impedance measurement in the device to the second impedance measurement in the second device, and
automatically perform a start up protection analysis of the device based on the start up impedance variation.

16. The system of claim 15, wherein the start up comparison is based on a difference between:
a start up ratio of the impedance measurement in the device to the second impedance measurement in the second device, and
a ratio of an impedance measurement in the device taken before the device has been turned on and an impedance measurement in the second device taken before the second device has been turned on.

17. The system of claim 16, wherein performance of the start up protection analysis comprises determining whether the start up impedance variation exceeds a predetermined threshold.

18. The system of claim 17, wherein performance of the start up protection analysis comprises determining whether an excessive start up impedance variation has persisted for a start up predetermined period of time.

19. The system of claim 16, wherein performance of the start up protection analysis comprises determining whether the start up impedance variation is caused by ambient temperature fluctuations.

20. The system of claim 16, wherein the processor is programmed to automatically perform a protective action for the device when it determines that the start up impedance variation exceeds a start up predetermined threshold for a start up predetermined period of time.

21. A computer-implemented protection system for use in a multi-phase electrical distribution network, the system comprising:
a first sensor operable to measure an impedance of a first device connected to a first phase of the distribution network to improve coupling of electrical potential from a source to a load;
a second sensor operable to measure an impedance of a second device connected to a second phase of the distribution network to improve coupling of electrical potential from a source to a load; and
a processor connected to the first and second sensors and programmed to:
receive an impedance measurement from the first sensor,
receive an impedance measurement from the second sensor,
automatically calculate a variation in impedance of the first device, the variation being based on a comparison of the impedance measurement in the first phase to the impedance measurement in the second phase, and
automatically perform a protection analysis of the first device based on the impedance variation.

22. The system of claim 21, wherein the comparison is based on a difference between:
a ratio of the impedance measurement in the first device to the second impedance measurement in the second device, and
a ratio of an impedance measurement in the first device taken before the first device has been turned on and an impedance measurement in the second device taken before the second device has been turned on.

23. The system of claim 21, wherein performance of the protection analysis comprises determining whether the impedance variation exceeds a predetermined threshold.

24. The system of claim 23, wherein performance of the protection analysis comprises determining whether an excessive impedance variation has persisted for a predetermined period of time.

25. The system of claim 21, wherein performance of the protection analysis comprises determining whether the impedance variation is caused by ambient temperature fluctuations.

26. The system of claim 21, wherein the processor is programmed to automatically perform a protective action for the first device when it determines that the impedance variation exceeds a predetermined threshold for a predetermined period of time.

27. The system of claim 21, wherein the first device comprises at least one of a capacitor and an inductor.

28. The system of claim 21, wherein the second device comprises at least one of a capacitor and an inductor.

29. A computer-implemented protection system for use in a multi-phase electrical distribution network, the system comprising:
   a sensor operable to measure an impedance of a capacitive device connected to a phase of the distribution network to improve coupling of electrical potential from a source to a load; and
   a processor connected to the sensor and programmed to:
      receive an impedance measurement from the sensor,
      automatically calculate a variation in impedance of the capacitive device, the variation being based on a comparison of the impedance measurement to a previous impedance measurement, and
      automatically perform a protection analysis of the capacitive device based on the impedance variation.

30. The system of claim 29, wherein the capacitive device comprises one or more capacitors.

31. The system of claim 29, wherein the sensor comprises a relay.

32. The system of claim 29, wherein the impedance comparison comprises a ratio between the impedance measurement and the previous impedance measurement.

33. The system of claim 32, wherein the impedance comparison comprises a difference between the ratio of the impedance measurements and one.

34. The system of claim 32, wherein performance of the protection analysis comprises determining whether the impedance variation exceeds a predetermined threshold.

35. The system of claim 34, wherein performance of the protection analysis comprises determining whether an excessive impedance variation has persisted for a predetermined period of time.

36. The system of claim 35, wherein the predetermined period of time is based on one or more of distribution network design, capacitive device placement in the distribution network, and capacitive device design.

37. The system of claim 32, wherein performance of the protection analysis comprises determining whether the impedance variation in the capacitive device is caused by ambient temperature fluctuations.

38. The system of claim 32, wherein the processor is programmed to automatically perform a protective action for the capacitive device when it determines that the impedance variation exceeds a predetermined threshold for a predetermined period of time.

39. The system of claim 32, further comprising a second sensor operable to measure a second impedance of a second capacitive device connected to a second phase of the distribution network, the second capacitive device being used to improve coupling of electrical potential from the source to the load.

40. The system of claim 39, wherein the processor is connected to the second sensor, the processor being programmed to perform the following during a predetermined period of time after the capacitive device and the second capacitive device are turn on:
   receive a second impedance measurement from the second sensor,
   automatically calculate a start up variation in impedance of the capacitive device, the start up variation being based on a start up comparison of the impedance measurement in the capacitive device to the second impedance measurement in the second capacitive device, and
   automatically perform a start up protection analysis of the capacitive device based on the start up impedance variation.

41. A method of distinguishing the cause of impedance variations in a device connected to a phase of a multi-phase electrical distribution network to improve coupling of electrical potential from a source to a load, the method comprising:
   measuring an impedance of the device,
   upon expiration of a predetermined period of time following a turning on of the device, automatically calculating a variation in impedance of the device, the variation being based on a ratio of the impedance measurement and a previous impedance measurement, and
   automatically performing a protection analysis of the device based on the impedance variation.

42. The method of claim 41, wherein the predetermined period of time is substantially zero.

43. The method of claim 41, wherein the device comprises a capacitor or an inductor.

44. The method of claim 41, wherein calculating the variation comprises calculating a difference between the ratio of the impedance variations and 1.

45. The method of claim 41, further comprising:
   measuring a second impedance of a second device connected to a second phase of the distribution network, the second device used to improve coupling of electrical potential from the source to the load, and
   before expiration of the predetermined period of time:
      automatically calculating a start up variation in impedance of the device, the start up variation being based on a start up comparison of the impedance measurement in the device to the second impedance measurement in the second device, and
      automatically performing a start up protection analysis of the device based on the start up variation calculation.

* * * * *